H. B. KING.
OIL TANK GAGE.
APPLICATION FILED JAN. 31, 1916.
1,194,846.
Patented Aug. 15, 1916.
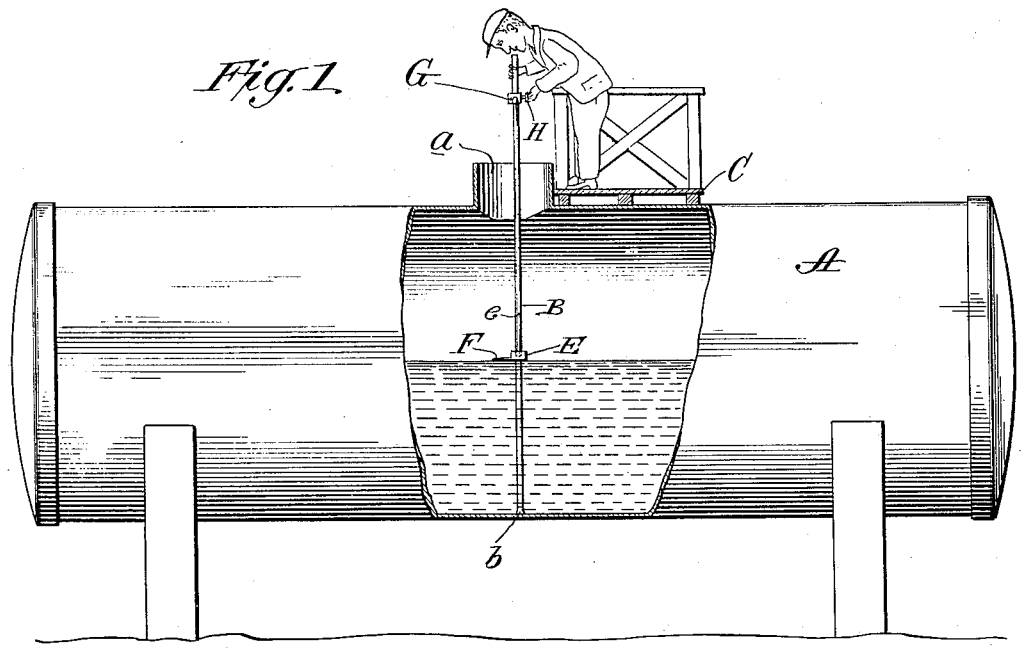
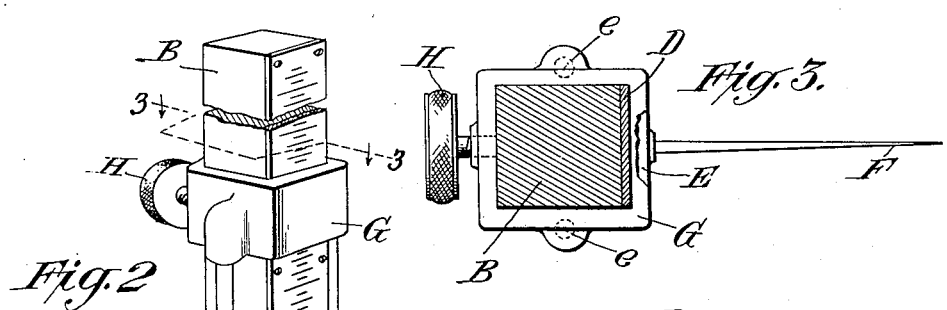
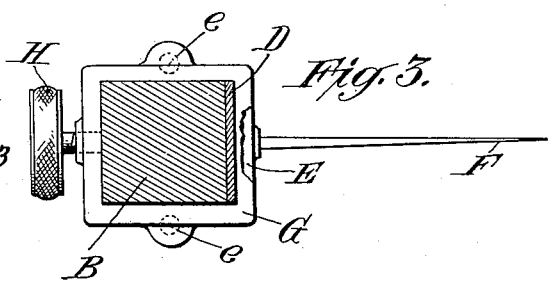
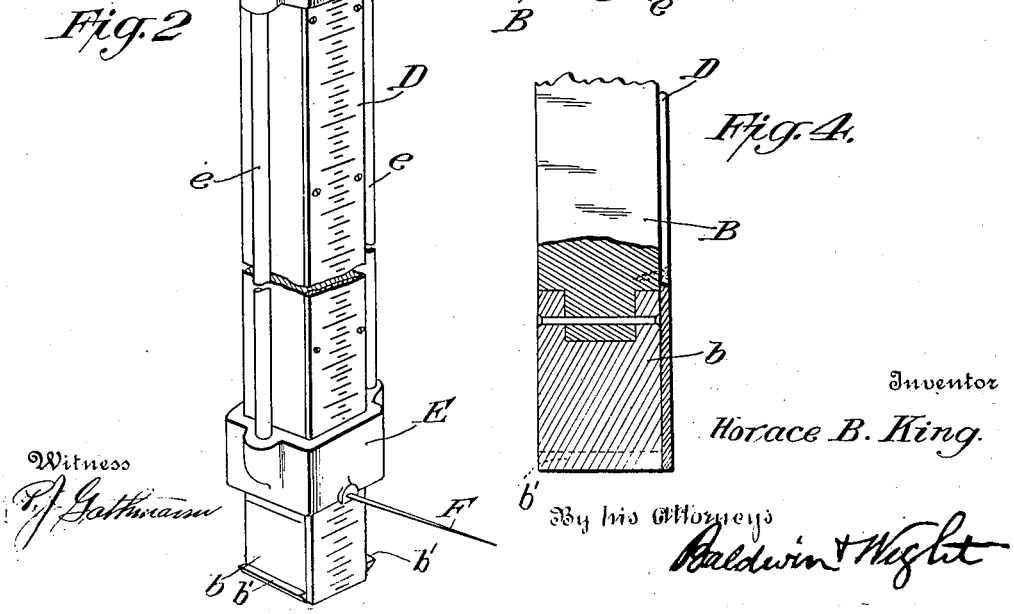
Inventor
Horace B. King.
By his Attorneys
Baldwin & Wight
Witness
P. J. Gathmann

UNITED STATES PATENT OFFICE.

HORACE B. KING, OF BOERNE, TEXAS.

OIL-TANK GAGE.

1,194,846.  Specification of Letters Patent.  Patented Aug. 15, 1916.

Application filed January 31, 1916. Serial No. 75,426.

*To all whom it may concern:*

Be it known that I, HORACE B. KING, a citizen of the United States, residing in Boerne, in the county of Kendall and State of Texas, have invented certain new and useful Improvements in Oil-Tank Gages, of which the following is a specification.

This invention relates to gages for measuring the depth of oil in tanks and other receptacles. The gage ordinarily used for this purpose comprises a pole having a suitable scale marked on it, and to measure the depth of oil in a tank or other receptacle with such gage the pole is lowered until it touches the bottom of the tank. The part of the pole which enters the oil will of course have oil deposited on it and the upper edge of this oiled portion of the pole indicates the depth of the oil in the tank. It has been the practice to insert a pin at the upper edge of the oiled portion of the pole and then test the accuracy of the measurement by lowering the pole until it touches the bottom of the tank and then if the pin just touches the surface of the oil it will be understood that the measurement is accurate; if not, the pole must be raised and the pin inserted at another point and again tested. It is quite common to insert the pole in the oil and take it out for inspection several times before the correct adjustment can be made and the exact depth of the oil found.

According to my invention I provide a gage comprising a pole to which is secured a scale plate and on which is mounted two slides, the lower one of which carries a needle or pointer and the upper one of which carries a set screw. The needle-carrying slide is adapted to move on the lower portion of the pole and it is connected to the upper slide by rods in such manner that by moving the upper slide vertically on the pole the lower slide may be correspondingly moved and thus when the needle is made to rest on or touch the surface of the oil the upper slide may be made fast to the gage-pole and the depth of the oil may be accurately determined. The gage-pole which is usually made of wood, is preferably provided at its lower end with a weight which causes it to sink and prevents it from rising when lowered.

In the accompanying drawings, Figure 1 is a view in elevation, and with parts broken away, of a well known form of oil tank and it illustrates how my invention is applied thereto. Fig. 2 is a perspective view of my improved oil tank gage with parts of the gage-pole broken away. Fig. 3 shows a transverse section on the line 3—3 of Fig. 2. Fig. 4 shows an elevation of the lower portion of the gage-pole with parts in section and illustrates how the weight is applied thereto.

The tank A is provided with an opening *a* which may be closed by a screw cap or in any other suitable way. When it is desired to measure the depth of oil in the tank the gage-pole B is inserted and is held by the attendant who may stand on a platform C. The pole B is preferably made of wood having attached to its lower end a weight *b* which causes it to sink and stand erect in the oil and prevents it from rising therein.

D indicates a scale plate which is attached to one side of the pole. It serves to prevent the wood from warping or bending and it is suitably graduated as indicated.

E indicates the lower slide in the form of a collar surrounding the lower portion of the pole and carrying the needle or pointer F.

G indicates a similar slide surrounding the upper portion of the pole and carrying a set screw H.

The slides E and G are connected by vertical rods *e* and the arrangement is such that by moving the upper slide vertically on the pole the lower needle-carrying slide may be correspondingly moved. The pole may be of any desired length and the collars E and G may be held any suitable distance apart by the rods *e*. Preferably, however, the dimensions are such that the collar G shall be always outside the tank or very close to the top thereof so that the attendant may easily grasp it and move it up and down on the pole. In this way when the pole is inserted it may be readily made to rest on the bottom of the tank, as indicated in Fig. 1. By manipulating the slide G and watching the needle F, the latter may be made to touch the surface of the oil, then the collar G may be made fast to the pole by the set-screw H and the exact depth of oil may be read on the scale. When the depth of oil is known the number of gallons of oil in the tank may be ascertained from suitable tables prepared for that purpose. The scale D extends to the bottom of the weight *b*, as shown in Fig. 4, and the downward movement of the lower slide E may be limited by lugs b' on the weight which preferably permits the slide to move downward to within ¼ of an inch of the bottom of the tank.

As before stated, the exact dimensions of the pole D are not essential, but in practice I have used a pole 18 ft. long so that when applied to a tank 10 ft. in diameter the outer end of the pole will extend 8 ft. above the top of the tank. In such case the rods e should be about 8 ft. long, thus holding the slides E and G 8 ft. apart.

I claim as my invention:

1. An oil tank gage, comprising a gage pole, a needle-carrying slide mounted to move on the lower portion thereof, a needle projecting horizontally from the slide, means extending to the upper portion of the pole for raising and lowering said needle-carrying slide, and devices for securing said means to the upper end of the pole when the needle-carrying slide is adjusted.

2. An oil tank gage, comprising a gage-pole weighted at its lower end, a needle-carrying slide on the pole and another slide on the upper portion of the pole, a needle projecting horizontally from the slide, provided with means for making it fast to the pole and which is connected with the needle-carrying slide.

3. An oil tank gage, comprising a gage-pole, a needle-carrying slide mounted to move on the lower portion thereof, a needle projecting horizontally from the slide, another slide mounted to move on the upper portion of the pole, rods connecting the two slides and a set-screw carried by the upper slide.

4. An oil tank gage, comprising a wooden pole, a weight attached to the lower end of the pole, a plate secured to one side of the pole and which is provided with a suitable scale, a needle-carrying slide mounted to move on the lower portion of the pole, a needle projecting horizontally from the slide, another slide connected with said needle-carrying slide and mounted to move on the upper portion of the pole, and a set-screw carried by the upper slide.

5. An oil tank gage, comprising a gage pole provided with a weight having lugs near its lower edge, a needle-carrying slide mounted to move on the lower portion of the pole and the downward movement of which is limited by said lugs, and means extending to the upper portion of the pole for raising and lowering said needle-carrying slide.

6. The combination with a tank having an opening in its top, of a gage comprising a gage pole adapted to enter the opening in the tank and to rest on the bottom of the tank, a needle-carrying slide mounted to move on that portion of the pole within the tank, a needle projecting laterally from the slide, means extending to the upper portion of the pole above the tank for raising and lowering said needle-carrying slide, and devices for securing said means to the upper end of the pole when the needle-carrying slide is adjusted.

In testimony whereof, I have hereunto subscribed my name.

HORACE B. KING.

Witnesses:
HILMAR FABA,
P. SPENCER.